US012725331B2

(12) United States Patent
Sree Harsha et al.

(10) Patent No.: US 12,725,331 B2
(45) **Date of Patent: *Sep. 1, 2026**

(54) DIGITAL VIDEO EDITING BASED ON A TARGET DIGITAL IMAGE

(71) Applicant: Adobe Inc., San Jose, CA (US)

(72) Inventors: Sai Sree Harsha, La Jolla, CA (US); Dhwanit Agarwal, San Jose, CA (US); Ambareesh Revanur, San Jose, CA (US); Shradha Agrawal, Milpitas, CA (US)

(73) Assignee: Adobe Inc., San Jose, CA (US)

(*) Notice: Subject to any disclaimer, the term of this patent is extended or adjusted under 35 U.S.C. 154(b) by 193 days.

This patent is subject to a terminal disclaimer.

(21) Appl. No.: 18/583,067

(22) Filed: Feb. 21, 2024

(65) Prior Publication Data

US 2025/0265752 A1 Aug. 21, 2025

(51) Int. Cl.
*G06T 11/60* (2026.01)
*G06T 5/70* (2024.01)

(52) U.S. Cl.
CPC ................ *G06T 11/60* (2013.01); *G06T 5/70* (2024.01)

(58) Field of Classification Search
CPC ........................................................ G06T 11/60
See application file for complete search history.

(56) References Cited

U.S. PATENT DOCUMENTS

2024/0169622 A1* 5/2024 Xie ......................... G06T 11/00
2024/0320965 A1* 9/2024 Ho ......................... G06N 3/045

OTHER PUBLICATIONS

Avrahami, Omri , et al., "Blended Diffusion for Text-driven Editing of Natural Images", 2022 IEEE/CVF Conference on Computer Vision and Pattern Recognition (CVPR) [retrieved Jan. 18, 2024]. Retrieved from the Internet <https://doi.org/10.1109/CVPR52688.2022.01767>, Jun. 2022, 11 pages.

Bar-Tal, Omer , et al., "Text2LIVE: Text-Driven Layered Image and Video Editing", Cornell University, arXiv Preprint, arxiv.org [retrieved Jan. 18, 2024]. Retrieved from the Internet <https://arxiv.org/pdf/2204.02491.pdf>, Apr. 5, 2022, 21 pages.

Caron, Mathilde , et al., "Emerging Properties in Self-Supervised Vision Transformers", Cornell University arXiv, arXiv.org [retrieved Oct. 10, 2023]. Retrieved from the Internet <https://arxiv.org/pdf/2104.14294.pdf>., May 24, 2021, 21 Pages.

(Continued)

*Primary Examiner* — Shivang I Patel
(74) *Attorney, Agent, or Firm* — FIG. 1 Patents

(57) ABSTRACT

Digital video editing techniques are described that are based on a target digital image. In one or more implementations, inputs are received. The inputs include a target text prompt, a target digital image depicting a target object, and a source digital video having a plurality of frames depicting a source object. Regions-of-interest are identified in the plurality of frames of the source digital video, respectively, based on the target text prompt and the target digital image using a machine-learning model, e.g., a diffusion model. A plurality of frames of a target digital video are generated as having the target object using a generative machine-learning model. The generating is based on the regions-of-interest, the target digital image, the source digital video, and a source text prompt describing the source digital video.

20 Claims, 8 Drawing Sheets

(56) References Cited

OTHER PUBLICATIONS

Ceylan, Duygu , et al., “Pix2Video: Video Editing using Image Diffusion”, Proceedings of the IEEE/CVF International Conference on Computer Vision (ICCV) [retrieved Jan. 25, 2024]., Oct. 2023, 12 pages.

Chai, Wenhao , et al., “StableVideo: Text-driven Consistency-aware Diffusion Video Editing”, Proceedings of the IEEE/CVF International Conference on Computer Vision (ICCV), Oct. 2023, 11 pages.

Couairon, Guillaume , et al., “DiffEdit: Diffusion-based semantic image editing with mask guidance”, Cornell University, arXiv Preprint, arxiv.org [retrieved Jan. 25, 2024]. Retrieved from the Internet <https://arxiv.org/pdf/2210.11427.pdf>, Oct. 20, 2022, 21 pages.

Dhariwal, Prafulla , et al., “Diffusion Models Beat GANs on Image Synthesis”, Cornell University arXiv, arXiv.org [retrieved Aug. 9, 2023]. Retrieved from the Internet <https://arxiv.org/pdf/2105.05233.pdf>., Jun. 1, 2021, 44 Pages.

Esser, Patrick , “Structure and Content-Guided Video Synthesis with Diffusion Models”, Proceedings of the IEEE/CVF International Conference on Computer Vision (ICCV) [retrieved Feb. 1, 2024]., Oct. 2023, 11 pages.

Geyer, Michal , et al., “TokenFlow: Consistent Diffusion Features for Consistent Video Editing”, Cornell University, arXiv Preprint, arxiv.org [retrieved Feb. 1, 2024]. Retrieved from the Internet <https://arxiv.org/pdf/2307.10373.pdf>, Jul. 19, 2023, 13 pages.

Girdhar, Rohit , et al., “Emu Video: Factorizing Text-to-Video Generation by Explicit Image Conditioning”, Cornell University, arXiv Preprint, arxiv.org [retrieved Feb. 1, 2024]. Retrieved from the Internet <https://arxiv.org/pdf/2311.10709.pdf> 1 of 2, Nov. 17, 2023, 29 pages.

Hertz, Amir , et al., “Prompt-to-Prompt Image Editing with Cross Attention Control”, Cornell University, arXiv Preprint, arxiv.org, Aug. 2, 2022, 19 pages.

Ho, Jonathan , et al., “Denoising Diffusion Probabilistic Models”, Cornell University arXiv, arXiv.org [retrieved Feb. 24, 2022]. Retrieved from the Internet <https://arxiv.org/pdf/2006.11239.pdf>., Dec. 16, 2020, 25 Pages.

Ho, Jonathan , et al., “Imagen video: High definition video generation with diffusion models”, Cornell University arXiv, arXiv.org [retrieved Aug. 9, 2023]. Retrieved from the Internet <https://arxiv.org/pdf/2210.02303.pdf>., Oct. 5, 2022, 18 Pages.

Kang, Minguk , et al., “Scaling up GANs for Text-to-Image Synthesis”, Proceedings of the IEEE/CVF Conference on Computer Vision and Pattern Recognition (CVPR), 2023, 11 pages.

Khachatryan , et al., “Text2Video-Zero: Text-to-Image Diffusion Models are Zero-Shot Video Generators”, Cornell University. arxiv.org, arXiv:2303.13439 [cs.CV], retrieved from the internet on May 20, 2024, <https://arxiv.org/pdf/2303.13439>, Mar. 23, 2023, 25 pages.

Kirillov , et al., “Segment Anything”, Cornell University, arXiv.org, arXiv:2304.02643 [cs.CV], retrieved from the internet on May 20, 2024, <https://arxiv.org/abs/2304.02643>, Apr. 5, 2023, 30 pages.

Kumari, Nupur , et al., “Ablating Concepts in Text-to-Image Diffusion Models”, Proceedings of the IEEE/CVF International Conference on Computer Vision (ICCV) [retrieved Jan. 24, 2024]. Retrieved from the Internet <, Mar. 23, 2023, 12 pages.

Liu , et al., “Grounding DINO: Marrying DINO with Grounded Pre-Training for Open-Set Object Detection”, Cornell University, ArXiv.org, arXiv:2303.05499 [cs.CV], retrieved from the internet on May 20, 2024, <https://arxiv.org/abs/2303.05499., Mar. 20, 2023, 17 pages.

Liu , et al., “Video-P2P: Video Editing with Cross-attention Control”, Cornell University, ArXiv.org, arXiv:2303.04761 [cs.CV], retrieved from the internet on May 20, 2024, <https://arxiv.org/abs/2303.04761>, Mar. 8, 2023, 10 pages.

Luo , et al., “VideoFusion: Decomposed Diffusion Models for High-Quality Video Generation”, Cornell University, ArXiv,org, arXiv:2303.08320 [cs.CV], retrieved from the internet on May 20, 2024, <https://arxiv.org/abs/2303.08320>, Oct. 13, 2023, 11 pages.

Meng, Chenlin , et al., “SDEdit: Guided Image Synthesis and Editing with Stochastic Differential Equations”, Cornell University, arXiv Preprint, arxiv.org, Aug. 2, 2021, 33 pages.

Molad , et al., “Dreamix: Video diffusion models are general video 715 editors”, Cornell University, arXiv.org, arXiv:2302.01329 [cs.CV], retrieved from the internet on May 20, 2024, <https://arxiv.org/abs/2302.01329., Feb. 2, 2023, 18 pages.

Nichol, Alex , et al., “Glide: Towards photorealistic image generation and editing with text-guided diffusion models”, Cornell University arXiv, arXiv.org [retrieved Feb. 20, 2023]. Retrieved from the Internet <https://arxiv.org/pdf/2112.10741.pdf>., Mar. 8, 2022, 20 Pages.

Nichol, Alex , et al., “Improved Denoising Diffusion Probabilistic Models”, Cornell University arXiv, arXiv.org [retrieved Aug. 9, 2023]. Retrieved from the Internet <https://arxiv.org/pdf/2102.09672.pdf>., Feb. 18, 2021, 17 Pages.

Parmar , et al., “Zero-shot image-to-image translation”, Cornell University, arXiv.org, arXiv:2302.03027 [cs.CV], retrieved from the internet on May 20, 2024, <https://arxiv.org/abs/2302.03027>, Feb. 6, 2023, 21 pages.

Patashnik, Or , et al., “StyleCLIP: Text-Driven Manipulation of StyleGAN Imagery”, Cornell University arXiv, arXiv.org [retrieved Feb. 20, 2023]. Retrieved from the Internet <https://arxiv.org/pdf/2103.17249.pdf>., Mar. 31, 2021, 18 Pages.

Podell , et al., “SDXL: Improving Latent Diffusion Models for High-Resolution Image Synthesis”, Cornell University, arXiv.org, arXiv:2307.01952 [cs.CV], retrieved from the internet on May 20, 2024, <https://arxiv.org/abs/2307.01952>, Jul. 4, 2023, 21 pages.

Qi , et al., “FateZero: Fusing Attentions for Zero-shot Text-based Video Editing”, Cornell University, arXiv.org, arXiv:2303.09535 [cs.CV], retrieved from the internet on May 20, 2024, <https://arxiv.org/abs/2303.09535>, Oct. 11, 2023, 13 pages.

Radford, Alec , et al., “Learning Transferable Visual Models From Natural Language Supervision”, Cornell University arXiv, arXiv.org [retrieved Jun. 29, 2023]. Retrieved from the Internet <https://arxiv.org/pdf/2103.00020.pdf>., Feb. 26, 2021, 48 Pages.

Ramesh, Aditya , et al., “Hierarchical Text-Conditional Image Generation with CLIP Latents”, Cornell University arXiv, arXiv.org [retrieved Aug. 11, 2023]. Retrieved from the Internet <https://arxiv.org/pdf/2204.06125.pdf>., Apr. 13, 2022, 27 Pages.

Revanur, Ambareesh , et al., “CoralStyleCLIP: Co-optimized Region and Layer Selection for Image Editing”, Cornell University arXiv, arXiv.org [retrieved Jun. 14, 2023]. Retrieved from the Internet <https://arxiv.org/pdf/2303.05031.pdf>., Mar. 9, 2023, 19 Pages.

Rombach, Robin , et al., “High-Resolution Image Synthesis with Latent Diffusion Models”, Cornell University arXiv, arXiv.org [retrieved Aug. 11, 2023]. Retrieved from the Internet <https://arxiv.org/pdf/2112.10752.pdf>., Apr. 13, 2022, 45 Pages.

Saharia, Chitwan , et al., “Photorealistic Text-to-Image Diffusion Models with Deep Language Understanding”, Cornell University arXiv, arXiv.org [retrieved Aug. 11, 2023]. Retrieved from the Internet <https://arxiv.org/pdf/2205.11487.pdf>., May 23, 2022, 46 Pages.

Singer , et al., “Make-A-Video: Text-to-Video Generation without Text-Video Data”, Cornell University, arXiv.org, arXiv:2209.14792 [cs.CV], retrieved from the internet on May 20, 2024, <https://arxiv.org/abs/2209.14792>, Sep. 29, 2022, 13 pages.

Song , et al., “Denoising Diffusion Implicit Models”, Cornell University, arXiv.org, arXiv:2010.02502 [cs.LG], retrieved from the internet on May 20, 2024, <https://arxiv.org/abs/2010.02502>, Oct. 5, 2022, 22 pages.

Song, Yizhi , et al., “ObjectStitch: Generative Object Compositing”, Cornell University, arXiv Preprint, arxiv.org, Dec. 2, 2022, 17 pages.

Teed, Zachary , et al., “RAFT: Recurrent All-Pairs Field Transforms for Optical Flow”, Cornell University arXiv, arXiv.org [retrieved Mar. 9, 2023]. Retrieved from the Internet <https://arxiv.org/pdf/2003.12039.pdf>., Aug. 25, 2020, 21 Pages.

Tumanyan , et al., “Plug-and-Play Diffusion Features for Text-Driven Image-to-Image Translation”, Cornell University, arXiv.org,

(56) References Cited

OTHER PUBLICATIONS arXiv:2211.12572 [cs.CV], retrieved from the internet on May 20, 2024, <https://arxiv.org/abs/2211.12572>, Nov. 22, 2022, 15 pages.

Van Den Oord, Aaron , "Neural Discrete Representation Learning", Advances in Neural Information Processing Systems 30 [retrieved Feb. 21, 2023]. Retrieved from the Internet <https://proceedings.neurips.cc/paper/2017/file/7a98af17e63a0ac09ce2e96d03992fbc-Paper.pdf>., Nov. 2017, 10 Pages.

Wang, Ting-Chun , et al., "High-Resolution Image Synthesis and Semantic Manipulation With Conditional GANs", Cornell University, arXiv, arXiv.org [retrieved Aug. 29, 2022]. Retrieved from the Internet <https://openaccess.thecvf.com/content_cvpr_2018/CameraReady/0768.pdf>., Nov. 2017, 10 Pages.

Wenyi, Hong , et al., "Cogvideo: Large-scale pretraining for text-to-video", Cornell University, arXiv Preprint, arxiv.org, May 29, 2022, 15 pages.

Wu , et al., "Tune-A-Video: One-Shot Tuning of Image Diffusion Models for Text-to-Video Generation", Cornell University, arXiv.org, arXiv:2212.11565 [cs.CV], retrieved from the internet on May 20, 2024, <https://arxiv.org/abs/2212.11565>, Mar. 17, 2023, 16 pages.

Yu , et al., "Scaling Autoregressive Models for Content-Rich Text-to-Image Generation", Cornell University, arXiv.org, arXiv:2206.10789 [cs.CV], retrieved from the internet on May 20, 2024, <https://arxiv.org/abs/2206.10789>, Jun. 22, 2022, 49 pages.

Zhang, Lvmin , et al., "Adding Conditional Control to Text-to-Image Diffusion Models", Cornell University, arXiv Preprint, arxiv.org [retrieved Nov. 10, 2023]. Retrieved from the internet <https://arxiv.org/pdf/2302.05543.pdf>, Feb. 10, 2023, 12 pages.

Zhao , et al., "Make-A-Protagonist: Generic Video Editing with an Ensemble of Experts", Cornell University, arXiv.org, arXiv:2305.08850 [cs.CV], retrieved from the internet on May 20, 2024, <https://arxiv.org/abs/2305.08850>, Feb. 19, 2024, 10 pages.

Zhou , et al., "MagicVideo: Efficient Video Generation With Latent Diffusion Models", Cornell University, arXiv.org, arXiv:2211.11018 [cs.CV], retrieved from the internet on May 20, 2024, <https://arxiv.org/abs/2211.11018>, May 11, 2023, 11 pages.

* cited by examiner

Figure 3:
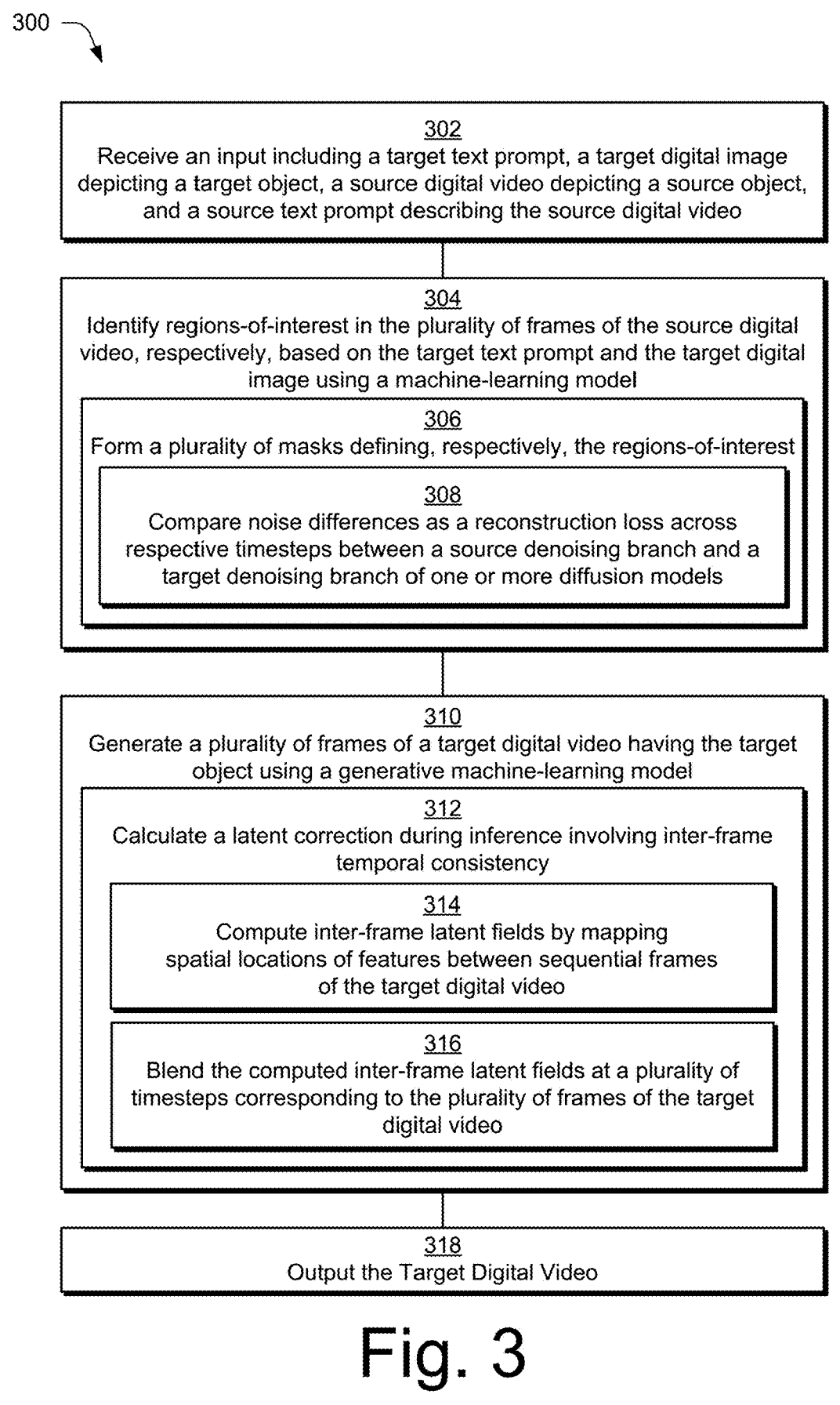

300

302
Receive an input including a target text prompt, a target digital image depicting a target object, a source digital video depicting a source object, and a source text prompt describing the source digital video 304
Identify regions-of-interest in the plurality of frames of the source digital video, respectively, based on the target text prompt and the target digital image using a machine-learning model 306
Form a plurality of masks defining, respectively, the regions-of-interest 308
Compare noise differences as a reconstruction loss across respective timesteps between a source denoising branch and a target denoising branch of one or more diffusion models 310
Generate a plurality of frames of a target digital video having the target object using a generative machine-learning model 312
Calculate a latent correction during inference involving inter-frame temporal consistency 314
Compute inter-frame latent fields by mapping spatial locations of features between sequential frames of the target digital video 316
Blend the computed inter-frame latent fields at a plurality of timesteps corresponding to the plurality of frames of the target digital video 318
Output the Target Digital Video

Figure 7:
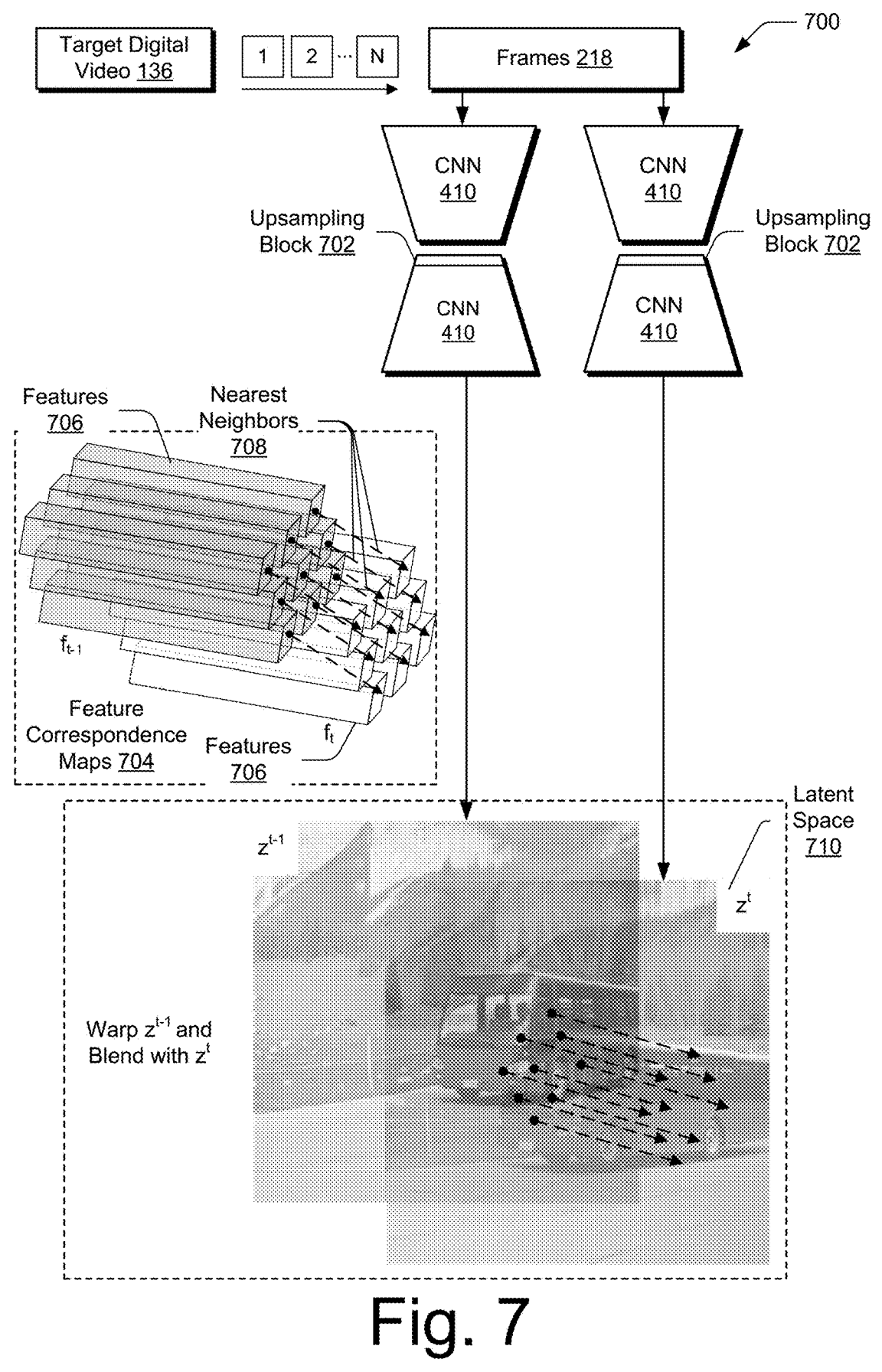

Target Digital Video 136

1 2 ... N

Frames 218

CNN 410

CNN 410

Upsampling Block 702

Upsampling Block 702

CNN 410

CNN 410

Features 706

Nearest Neighbors 708

$f_{t-1}$ $f_t$

Feature Correspondence Maps 704

Features 706

Latent Space 710

$z^{t-1}$ $z^t$

Warp $z^{t-1}$ and Blend with $z^t$

DIGITAL VIDEO EDITING BASED ON A TARGET DIGITAL IMAGE

BACKGROUND

Conventional techniques that rely on machine-learning models to perform digital video edits are confronted with numerous technical challenges that reduce accuracy in achieving a desired output. Digital video, for instance, introduces additional technical challenges over editing of singular digital images. This is because generation of digital video involves visual and temporal consistency that is to be maintained between consecutive digital images that form frames of the digital video.

Additionally, conventional digital video editing techniques are limited by an amount of expressive power that is supported in specifying how to perform the edits. Accordingly, conventional techniques are hindered in an ability to define, typically using text, as to "what is to be performed" as part of the edit by a respective machine-learning model. These technical challenges are further aggravated when confronted with edits involving objects having differing sizes and shapes, one to another. Conventional techniques, for instance, often fail in replacement of an object having a shape and size that is different from a shape and size of another object that is to serve as the replacement. Because of this, conventional digital video editing techniques often result in visual inaccuracies, incur computational inefficiencies, and result in increased power consumption.

SUMMARY

Digital video editing techniques are described that are based on a target digital image. In one or more implementations, inputs are received. The inputs include a target text prompt, a target digital image depicting a target object, and a source digital video having a plurality of frames depicting a source object. Regions-of-interest are identified in the plurality of frames of the source digital video, respectively, based on the target text prompt and the target digital image using a machine-learning model, e.g., a diffusion model. A plurality of frames of a target digital video are generated as having the target object using a generative machine-learning model. The generating is based on the regions-of-interest, the target digital image, the source digital video, and a source text prompt describing the source digital video.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRA WINGS

The detailed description is described with reference to the accompanying figures. Entities represented in the figures are indicative of one or more entities and thus reference is made interchangeably to single or plural forms of the entities in the discussion.

FIG. 3 is a flow diagram depicting an algorithm as a step-by-step procedure in an example implementation of operations performable for accomplishing a result of target digital video generation based on a source digital video, a source text prompt, a target digital image, and a target text prompt.

FIG. 7 depicts a system in an example implementation showing operation of a latent correction module of the video generation system of FIG. 2 in greater detail.

FIG. 8 illustrates an example system including various components of an example device that can be implemented as any type of computing device as described and/or utilize with reference to the previous figures to implement embodiments of the techniques described herein.

DETAILED DESCRIPTION

Overview

Figure 1:
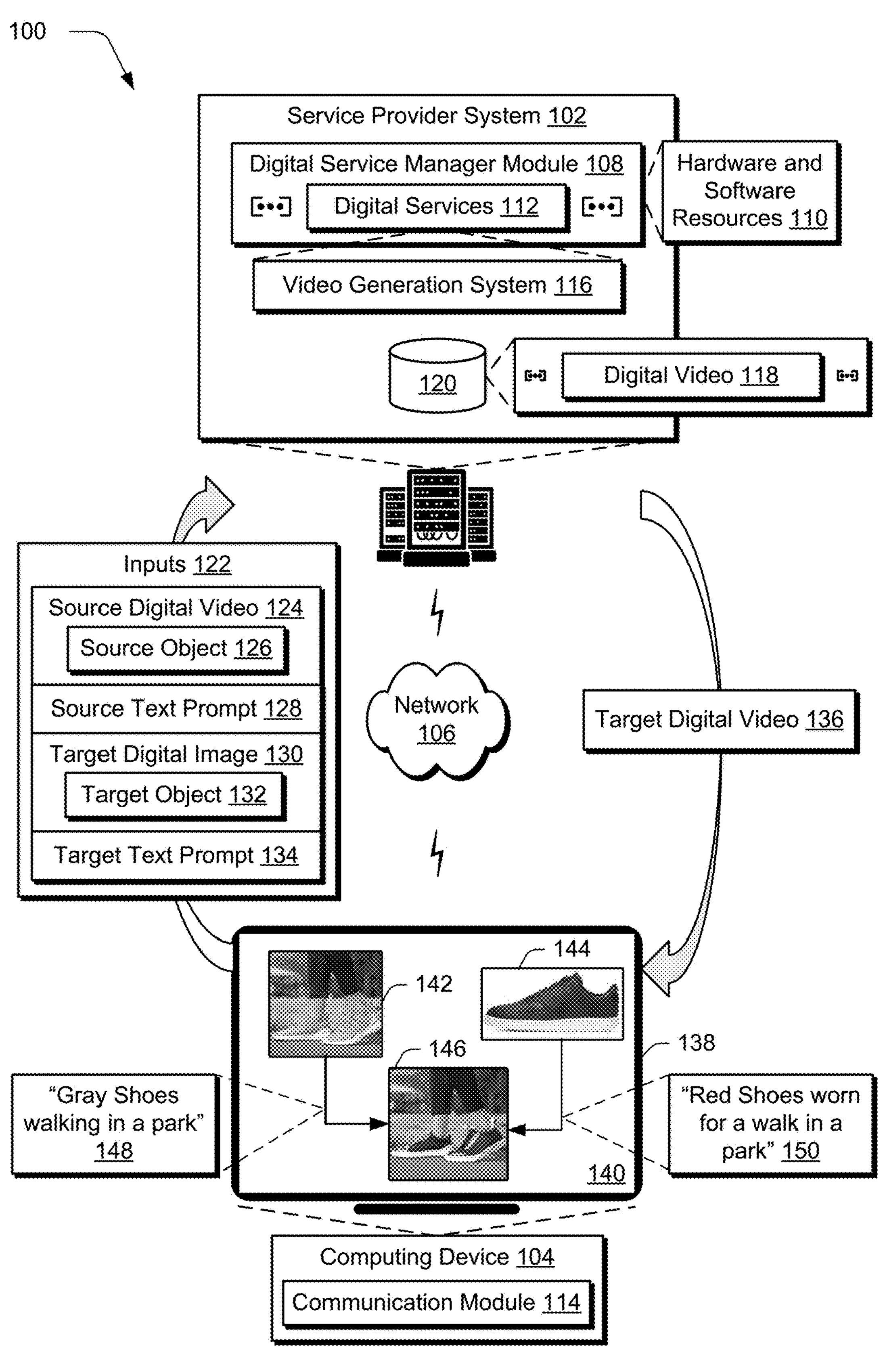
FIG. 1 is an illustration of a digital medium environment in an example implementation that is operable to employ digital video editing based on a target digital image as described herein.

Conventional generative techniques used to support digital video editing are confronted with numerous technical challenges. These technical challenges limit accuracy of digital video editing, do not support temporal consistency between frames of the digital video, and are incapable of addressing object replacement using varying shapes and sizes.

Conventional techniques that are based on diffusion models, for instance, rely solely on a text prompt for specifying an edit. A diffusion model is a type of generative machine-learning model that is used for digital content creation. In order to train a diffusion model, noise is added to training data samples until the data within the training data samples is obscured. The diffusion model is then trained to reverse this process based on training data that also has a text prompt that describes the digital content to be created in order to generate data samples as the digital content that corresponds to the text prompt.

Conventional techniques that rely on diffusion models for content creation, therefore, are unsuitable for scenarios in which a nature of the edit cannot be accurately expressed using text, solely. As a result, the limited expressive power of the text prompt relied upon by these conventional techniques limits accuracy in performing an edit. Additionally, conventional techniques lack shape awareness and therefore fail in scenarios in which a source object to be replaced has a size and/or shape is substantially different than a target object that is to replace the source object. Further, conventional techniques fail to enforce inter-frame temporal consistency and thus result in visual artifacts that are readily noticeable to a human being when viewing the digital video.

Accordingly, digital video editing techniques that are based on a target digital image are described. These techniques are configurable to leverage a target digital image depicting a target object as a visual guide to improve accuracy in editing a source digital video in order to generate a target digital video. In this way, the target object, as depicted in the target digital image, expands expressiveness supported in editing the source digital video. The expanded expressiveness also supports a variety of functionalities that are not supported by conventional digital video editing techniques, including an ability of handle edits involving objects having different size and shapes, an ability to maintain temporal consistency between frames of the target digital video being generated, and so forth. The digital video editing techniques, for instance, are usable to replace a source object in a digital video with a target object having a different size and shape as following movement exhibited by the source object in the source digital video. In this way, the digital video editing techniques overcome technical challenges of conventional techniques as part of digital video generation.

In one or more examples, inputs are received by a video generation system that is configured to generate a target digital video, e.g., using generative artificial intelligence as implemented using one or more machine-learning models. The inputs include a target text prompt, a target digital image depicting a target object, a source digital video having a plurality of frames depicting a source object, and a source text prompt describing the source digital video.

The source digital video, for instance, depicts a source object of a white bus as driving down a road having a background of a mountain scene. The source text prompt describes the source digital video as "Driving a white bus down a mountain road." The target digital image includes a red sport utility vehicle (SUV) and the target text prompt describes "Driving a red SUV down a mountain road." In this example, the video generation system is tasked with replacing the white bus with the red SUV as expressed by the target text prompt and depicted in the target digital image as part of generating a target digital video.

The video generation system begins by first identifying regions-of-interest in the frames of the source digital video. To do so in one or more examples, the video generation system employs one or more diffusion models using generative artificial intelligence (AI) techniques to generate masks of the respective frames. The one or more diffusion models, for instance, include a source denoising branch configured to process the source text prompt and a target denoising branching configured to process the target text prompt and the target object of the target digital image.

The source digital video is then transformed using randomized latent noise, which is then denoised by the respective branches of the one or more diffusion models. Differences in the denoising operations as performed across respective timesteps in the respective branches are compared and then used (e.g., as a reconstructive loss) as a basis to form the masks, e.g., which are averaged and binarized to define the regions-of-interest. In this way, the regions-of-interest are generated by the video generation system as "target aware" by leveraging knowledge provided by the target object in the target digital image, which is not possible in conventional solely text-based techniques. The masks, as identifying the regions-of-interest, are injected into a subsequent machine-learning model (e.g., as embeddings) along with indications of respective timesteps (e.g., also as embeddings) in order to generate the target digital video.

Although the masks are configured to accurately identify the regions-of-interest that are to be a subject of an edit, the masks themselves do not address temporal consistency of an object within the regions-of-interest across the generated frames. Continuing with the above example, while a shape of an edit from a "white bus" to a "red SUV" across consecutive frames may appear generally similar, a different stylistic appearance of the shape may be employed to provide visual consistency. Although conventional techniques have been developed that employ optical flow, these conventional techniques exhibit inaccuracies in scenarios involving different shapes or different stylistic appearances.

Accordingly, the video generation system in this example is configured to implement a latent correction strategy during inference in generation of the target digital video. The video generation system, for example, is also configured to utilize a generative machine-learning model implemented using a diffusion model to generate the target digital video. To do so, the diffusion model takes as an input the regions-of-interest (e.g., the masks as described above), the target digital image, the source digital video, and the source text prompt. The video generation system then performs denoising operations on the regions-of-interest as part of including the target object in respective frames of the target digital video.

As part of generating the frames of the target digital video, a three-step process is performed as part of a latent correction strategy by the video generation system to promote temporal consistency. First, an inter-frame latent field is computed based on features between consecutive frames of the target digital video, e.g., as nearest neighbors. The inter-frame latent field therefore defines a mapping from spatial locations of features in a first frame to its nearest neighbor (e.g., in terms of cosine similarity) to features in a second frame, e.g., that follows the first frame consecutively in a sequence.

Second, the video generation system blends the computed inter-frame latent fields of adjacent frames inside the regions-of-interest, i.e., the mask regions. The video generation system, for instance, employs a decoder of a machine-learning model to perform the blending at each inference timestep corresponding to respective frames of the target digital video. Third, the video generation system is configured to preserve a background of the source digital video in one or more examples by limiting the denoising operations to the regions-of-interest defined by the masks.

In this way, the video generation system is configured to generate a target digital video having a target object that follows movement of a source object within a source digital video. To achieve this functionality, the video generation system is configured to expand expressiveness supported in editing the source digital video through use of a target digital image that depicts the target object. The expanded expressiveness also supports a variety of functionalities that are not supported by conventional digital video editing techniques, including an ability of handle edits involving objects having different size and shapes, maintaining temporal consistency between frames of the target digital video being generated, and so forth. Further discussion of these and other examples is included in the following sections and shown in corresponding figures.

Term Examples

A "machine-learning model" refers to a computer representation that can be tuned (e.g., trained and retrained) based on inputs to approximate unknown functions. In particular, the term machine-learning model can include a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, decision trees, and so forth.

A "diffusion model" is a type of generative machine-learning model that is used for digital content creation. In order to train a diffusion model, noise is added to training data samples until the data within the training data samples is obscured. The diffusion model is then trained to reverse this process based on training data that also has a text prompt that describes the digital content to be created in order to generate data samples as the digital content that corresponds to the text prompt.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Digital Video Generation Environment

FIG. 1 is an illustration of a digital medium environment 100 in an example implementation that is operable to employ digital video editing based on a target digital image as described herein. The illustrated environment 100 includes a service provider system 102 and a computing device 104 that are communicatively coupled, one to another, via a network 106. Computing devices are configurable in a variety of ways.

A computing device, for instance, is configurable as a desktop computer, a laptop computer, a mobile device (e.g., assuming a handheld configuration such as a tablet or mobile phone), and so forth. Thus, a computing device ranges from full resource devices with substantial memory and processor resources (e.g., personal computers, game consoles) to a low-resource device with limited memory and/or processing resources (e.g., mobile devices). Additionally, although a single computing device is shown and described in instances in the following discussion, a computing device is also representative of a plurality of different devices, such as multiple servers utilized by a business to perform operations "over the cloud" for the service provider system 102 and as further described in relation to FIG. 8.

The service provider system 102 includes a digital service manager module 108 that is implemented using hardware and software resources 110 (e.g., a processing device and computer-readable storage medium) in support one or more digital services 112. Digital services 112 are made available, remotely, via the network 106 to computing devices, e.g., computing device 104. Digital services 112 are scalable through implementation by the hardware and software resources 110 and support a variety of functionalities, including accessibility, verification, real-time processing, analytics, load balancing, and so forth. Examples of digital services include a social media service, streaming service, digital content repository service, content collaboration service, and so on. Accordingly, in the illustrated example, a communication module 114 (e.g., browser, network-enabled application, and so on) is utilized by the computing device 104 to access the one or more digital services 112 via the network 106. A result of processing using the digital services 112 is then returned to the computing device 104 via the network 106.

In the illustrated example, the digital services 112 are utilized to implement a video generation system 116 that is configured to generate a digital video 118, which is stored in a storage device 120. Although illustrated as implemented remotely by the service provider system 102, functionality of the video generation system 116 is also configurable for implementation locally, e.g., as part of the communication module 114 at the computing device 104. The video generation system 116 is configured to leverage generative artificial intelligence (AI) techniques implemented using a machine-learning model (e.g., one or more diffusion models) to generate the digital video 118.

To do so, the video generation system 116 receives inputs 122, e.g., from the computing device 104. The inputs 122 include a source digital video 124 having a source object 126, a source text prompt 128, a target digital image 130 having a target object 132, and a target text prompt 134. The video generation system 116 then leverages insights and expressiveness supported by the target object 132 in order to generate a target digital video 136. In the target digital video 136, in one or more examples, the target object 132 follows movement of the source object 126 in the source digital video 124, thereby functioning as an edit to the source digital video 124.

As previously described, conventional generative digital video editing techniques that employ diffusion models rely solely on a text prompt. Accordingly, conventional techniques are limited by an expressiveness supported by text. As a result, conventional techniques also struggle to accurately edit a digital video when a size and shape between a source object that is to be replaced and a target object used to replace the source object differ.

Accordingly, to address these and other technical challenges, the video generation system 116 is configured to employ a target digital image 130 depicting a target object 132 as part of generating the target digital video 136. Through use of the target digital image 130, and more particularly identification of the target object 132 within the target digital image 130, the video generation system 116 is configurable to overcome conventional technical challenges through increased expressiveness of the target object 132 over conventional techniques that are limited to text, alone. As a result, the video generation system 116 is configured to overcome conventional technical challenges in support of digital video generation to address variances in shapes and sizes as well as promote temporal consistency between frames of the target digital video 136.

As displayed by a display device 138 in a user interface 140 of the computing device 104, for instance, a source digital video 142 depicts a person's feet as walking and wearing gray shoes. A target digital image 144 depicts a target object as a red shoe. The source digital video 142 and the target digital image 144 are usable by the video generation system 116 to generate a target digital video 146 of the person's feet that are walking and wearing red shoes. Examples of inputs 122 provided in this example further include a source text prompt that uses text to describe what is depicted in the source digital video, e.g., "gray shoes walking in a park" 148. The inputs 122 also include a target text prompt describing an edit involving what is to be depicted in the target digital video 146, e.g., "red shoes worn for a walk in a park" 150. The target digital video 146 is then generated in this example as replacing a source object (e.g., the gray shoes) with a target object (e.g., the red shoes) as following motion of the source object in the source digital video 142. The video generation system 116 is able to do so even though shapes of the gray shoes and the red shoe may vary between different frames of the target digital video 146. Further, the video generation system 116 is also configurable to promote temporal consistency between frames of the target digital video 146. Further discussion of operation of the video generation system 116 as performing digital video editing based on a target digital image is described in the following section and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Example Digital Video Generation Guided by a Target Digital Image

The following discussion describes digital video generation techniques that are implementable utilizing the described systems and devices. Aspects of each of the procedures are implemented in hardware, firmware, software, or a combination thereof. The procedures are shown as a set of blocks that specify operations performable by hardware and are not necessarily limited to the orders shown for performing the operations by the respective blocks. Blocks of the procedures, for instance, specify operations programmable by hardware (e.g., processor, microprocessor, controller, firmware) as instructions thereby creating a special purpose machine for carrying out an algorithm as illustrated by the flow diagram. As a result, the instructions are storable on a computer-readable storage medium that, in response to execution by a processing device, causes the hardware to perform the algorithm.

Figure 2:
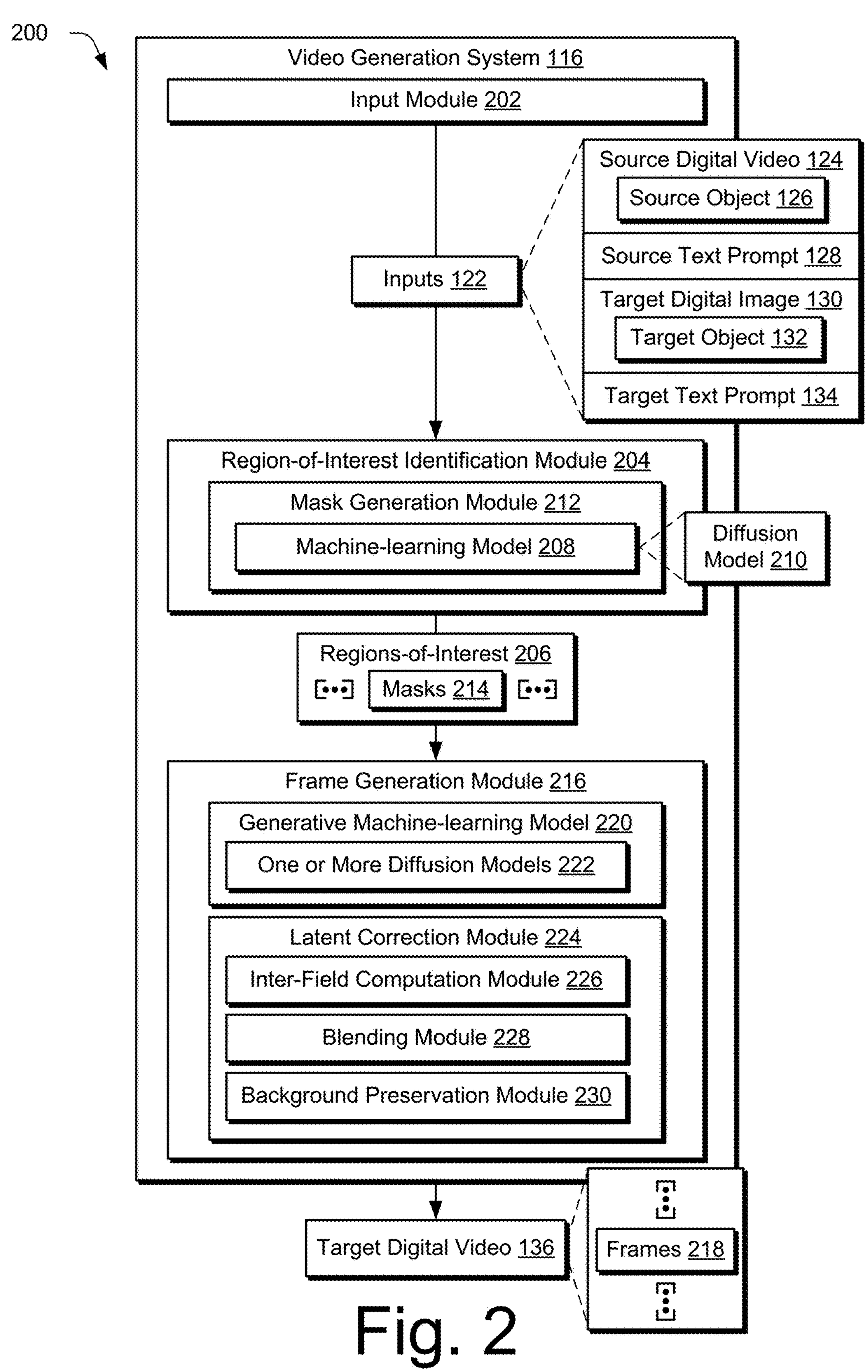
FIG. 2 depicts a system in an example implementation showing operation of a video generation system of FIG. 1 in greater detail.

FIG. 2 depicts a system 200 in an example implementation showing operation of a video generation system 116 of FIG. 1 in greater detail. FIG. 3 is a flow diagram depicting an algorithm 300 as a step-by-step procedure in an example implementation of operations performable for accomplishing a result of target digital video generation based on a source digital video, a source text prompt, a target digital image, and a target text prompt. Portions of the algorithm 300 are described in parallel in the following discussion as part of describing operation of the system 200 of FIG. 2.

Use of diffusion models has gained popularity in scenarios involving editing of static digital images (i.e., a single digital image) using text prompts. Although success has been exhibited in these scenarios, these techniques often fail when confronted with digital video editing tasks as focused exclusively on use of text to describe the edits. Accordingly, as previously described these conventional techniques often fail in scenarios in which a nature of the edit cannot be accurately expressed using text, alone. Further, conventional techniques lack shape awareness and therefore also fail in instances in which a shape and/or size of a target object differs substantially from a shape and/or size of a source object in a source digital video.

The video generation system 116, therefore, is configurable to address these and other technical challenges. The video generation system 116, for instance, is configurable to identify regions-of-interest in frames of a source digital video, respectively. To do so, the video generation system 116 is configurable to employ a diffusion model that processes the source digital video based on a target text prompt and the target digital image. In one or more examples, the diffusion model does so after being inflated and trained according to a one-shot finetuning approach as further described below in relation to FIG. 4.

The video generation system 116 is also configurable to address technical challenges involving maintenance of temporal consistency between frames of the target digital video being generated, i.e., the edited digital video. Conventional techniques are guided by the source digital video to maintain temporal consistency, e.g., by using source-based neural-layer atlases, source-based inter-frame feature propagation, and so on. However, these conventional techniques fail in instances in which a target object substantially differs from a source object being replaced, e.g., by size and/or shape.

To address these technical challenges, the video generation system 116 is configurable to implement a latent correction strategy to blend inter-frame latent fields computed by the diffusion model "on the fly" (i.e., in real time) during inference to improve inter-frame temporal consistency of the target object in the target digital video. The video generation system 116, for instance, is configurable to employ guidance based on identification of the regions-of-interest (e.g., masks) to support temporal consistency even in instances in which a target object has a different shape and/or size than a source object in a source digital video, which is not possible using conventional techniques.

To begin in the example system 200 of FIG. 2, an input module 202 receives a plurality of inputs 122 (block 302). The inputs 122 includes a source digital video 124, e.g., $$``V^{src}=[I_1^{src}, \ldots I_N^{src}]"$$

having "N" frames containing a source object 126. The inputs 122 also include a source text prompt 128 (e.g., "$P^{src}$") that describes the source digital video 124. A target digital image 130 "$I^{trg}$" is also received as part of the inputs 122 and includes a target object 132. The inputs 122 further include a target text prompt 134 (e.g., "$P^{trg}$") describing an edit to be made to the source digital video 124. The video generation system 116 generates a target digital video 136

$$``V^{trg}=[I_1^{trg}, \ldots I_N^{trg}]"$$

which preserves motion of the source digital video 124 but replaces the source object 126 with a target object 132 from the target digital image 130 in this example.

The inputs 122 are then passed to a region-of-interest identification module 204. The region-of-interest identification module 204 is configured to identify regions-of-interest 206 in a plurality of frames, respectively of the source digital video 124 based on the target text prompt 134 and the target digital image 130 using a machine-learning model 208. The machine-learning model 208, for example is configurable as a diffusion model 210, which is trainable in a variety of ways, an example of which is described as follows and shown in a corresponding figure.

Figure 4:
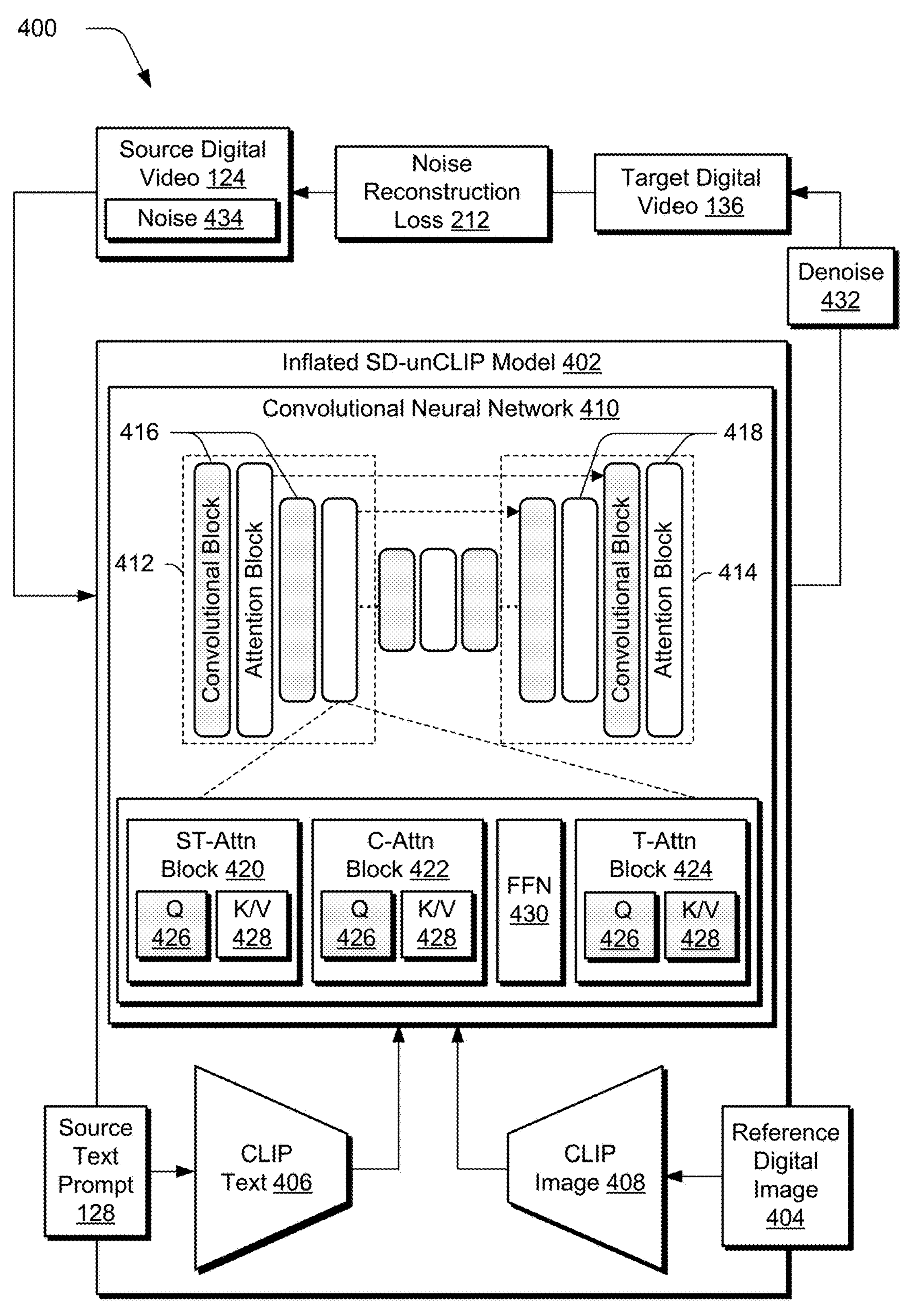
FIG. 4 depicts a system in an example implementation showing training of a machine-learning model of a region-of-interest identification module of FIG. 2.

FIG. 4 depicts a system 400 in an example implementation showing training of the machine-learning model 208 of the region-of-interest identification module 204 of FIG. 2. In this example, the machine-learning model 208 is implemented as a stable diffusion text-to-image model, shown as the inflated SD-unCLIP model 402. The inflated SD-unCLIP model 402 accepts CLIP image embeddings and CLIP text embedding as conditional inputs. The inflated SD-unCLIP model 402 conditions video generation on the source text prompt 128 and a reference digital image 304 taken from the source digital video 124. The source text prompt 128 provides context to the inflated SD-unCLIP model 402 about the source digital video 124, such as "a person wearing gray shoes," "a women wearing gray shoes," and the like. The reference digital image 404 is sampled as a frame (e.g., randomly) from the source digital video 124. In the illustrated example, the inflated SD-unCLIP model 402 implements a CLIP text conditional model (illustrated as "CLIP text 406") for receiving the source text prompt 128 and a CLIP image conditional model (illustrated as "CLIP image 408") for receiving the reference digital image 404.

The inflated SD-unCLIP model 402 is implemented, at least in part, using a convolutional neural network 410 in this example. In some implementations, the convolutional neural network 410 is or uses an architecture similar to a U-Net. The convolutional neural network 410, for example, is configurable to use an architecture that follows an encoder-decoder structure in which a contracting path represents an encoder 412 and an expanding path represents a decoder 414.

The convolutional neural network 410 receives the source digital video 124 having noise 434 added, the source text prompt 128 via the CLIP text 406 conditional model, and the reference digital image 404 via the CLIP image 408 conditional model. The convolutional neural network 410 processes this data through various components, shown as convolutional blocks 416 (in gray) and attention blocks 418 (in white). The convolutional blocks 416 process and extract features from the input data by applying filters and reducing data dimensions to achieve efficient and effective feature representation. The attention blocks 418 enhance the ability of the convolutional neural network 410 to selectively focus on and emphasize relevant features in a given input.

In the illustrated example, the attention blocks 418 include a spatio-temporal attention block (ST-Attn block 420) that enables the convolutional neural network 410 to focus on specific spatial (i.e., location-based) and temporal (i.e., time-based) aspects of the input data frames simultaneously. A cross attention block (C-Attn block 422) enables the convolutional neural network 410 to process multiple data types, such as text and image data. Processing of the multiple data types allows the inflated SD-unCLIP model 402 to focus on relevant parts of one input (e.g., the source text prompt 128) based on information from another input, e.g., the reference digital image 404. In this manner, the inflated SD-unCLIP model 402 effectively integrates and processes data across different data types.

An additional temporal attention block (T-Attn block 424) is introduced after the ST-Attn block 420 and the C-Attn block 422, i.e., a cross attention block. The T-Attn block 424 enhances the ability of the convolutional neural network 410 to process and interpret sequential or time-series data, such as the video frames included as part of the source digital video 124. In one or more implementations, parameters of the ST-Attn block 420, the C-Attn block 422, and the T-Attn block 424 are fine-tuned while keeping the convolutional blocks 416 frozen.

In particular, query weights (illustrated as Q 426) for the ST-Attn block 420 and the C-Attn block 422 are updated while key/value weights (illustrated as K/V 428) are left unchanged. In addition, each of the query weights (Q 426) and key/value weights (K/V 428) for the T-Attn block 424 are updated. Updated weights for each type of attention block 418 are depicted in gray in FIG. 4.

The query weights (Q 426) are parameters in the convolutional neural network 410 that transform input data into a query representation and used to determine the relevance of different parts of the input. The key/value weights (K/V 428) are parameters in the convolutional neural network 410 that transform input data into "key" and "value" representations, where key representations are used to match with queries and value representations carry the information to be focused on after matching.

Fine-tuning the query weights (Q 426) and the key/value weights (K/V 428) enables optimization of the inflated SD-unCLIP model 402 for target-aware and temporally consistent generation of the target digital video 136. Specifically, fine-tuning of the weights allows the inflated SD-unCLIP model 402 to better adapt to the nuances of dynamics of the source digital video 124, enhancing the ability of the inflated SD-unCLIP model 402 to accurately weigh the importance of different parts of the inputs 122 and to make precise predictions.

The illustrated example shows the convolutional neural network 410 configured as a feed forward network, depicted as "FFN 430." A feed forward network is type of neural network architecture where connections between nodes (i.e., neurons) move in a single direction, from input to output, without forming a loop. In the example neural network architecture, the feed forward network (FFN 430) is augmented with the convolutional blocks 416 and the attention blocks 418. The convolutional blocks 416, which are adept at processing visual information, act as feature extractors that capture spatial hierarchies in data, such as edges or textures in the reference digital image 404. These extracted features are then passed through the feedforward layers for further processing.

The attention blocks 418, which are effective in sequence processing tasks like text or time series analysis and spatial processing tasks, enable the convolutional neural network 410 to focus selectively on different parts of the input. By integrating these blocks, the feed forward network (FFN 430) combines the spatial processing capabilities of a convolutional neural network and the sequence-focused processing of attention mechanisms, enhancing the ability of the inflated SD-unCLIP model 402 to handle complex tasks that involve both feature extraction and focused attention on specific input segments.

The convolutional neural network 410, once trained as an example of the machine-learning model 208 of FIG. 2, is then employed to generate the regions-of-interest 206 from the source digital video 124 based on the target object 132 of the target digital image 130 and the target text prompt 134. The region-of-interest identification module 204, for instance, employs a mask generation module 212 that is configured to employ the machine-learning model 208 to form a plurality of masks 214 defining, respectively, the regions-of-interest 206 (block 306). To do so in one or more examples, noise differences are compared as a reconstruction loss across respective timesteps between a source denoising branch and a target denoising branch of one or more diffusion models 210 (block 308). Further discussion of use of a noise reconstruction loss is included in the following description and shown in a corresponding figure.

Figure 5:
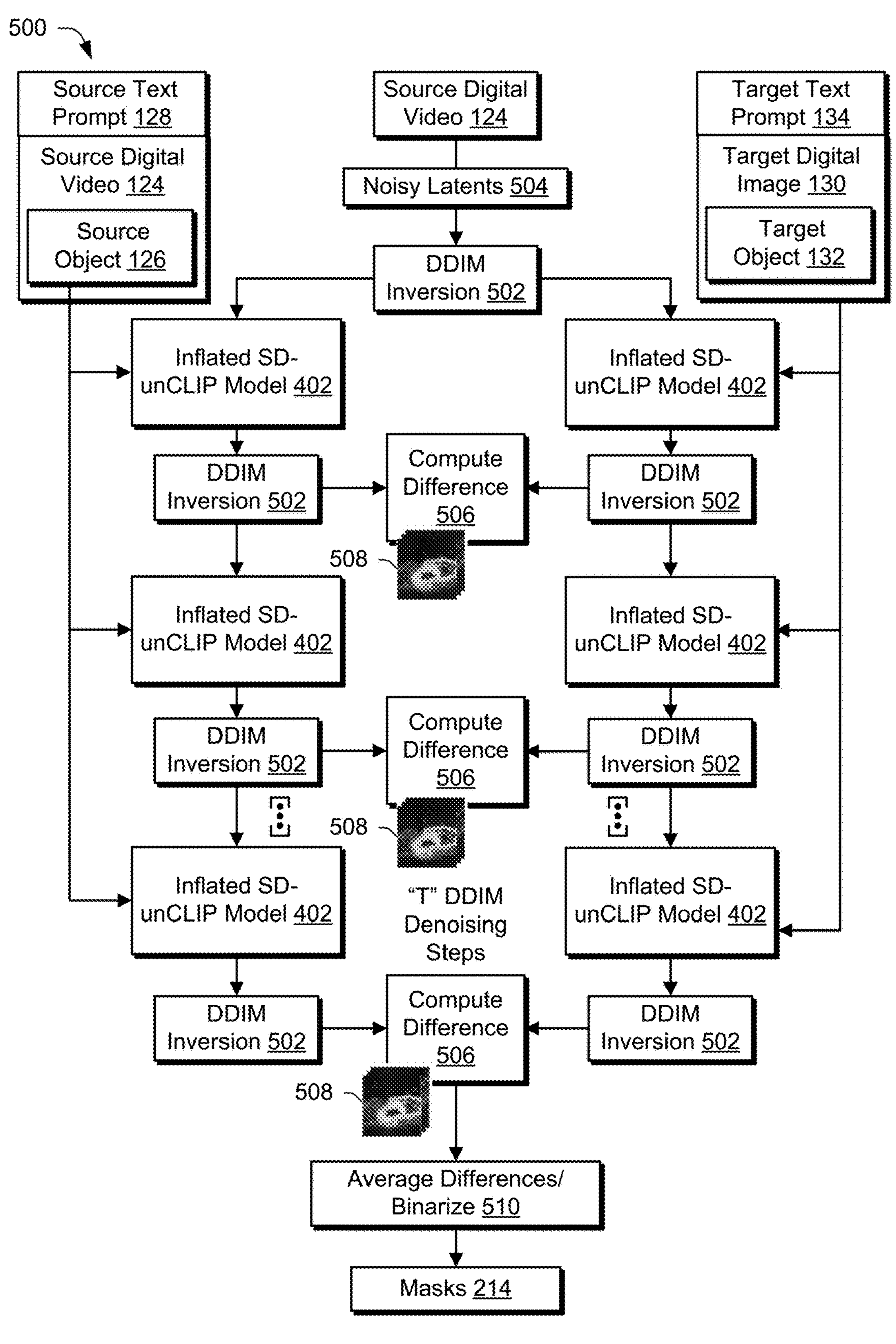
FIG. 5 depicts a system in an example implementation showing operation of a generation module of the video generation system of FIG. 2 in greater detail.

FIG. 5 depicts a system 500 in an example implementation showing operation of the mask generation module 212 of the video generation system 116 of FIG. 2 in greater detail. A source denoising branch of the diffusion model 210 of FIG. 2 is illustrated as receiving a source text prompt 128 and a source digital video 124 having a source object 126. A target denoising branch, on the other hand, is illustrated as receiving a target text prompt 134 and a target digital image 130 depicting a target object 132.

The system 500 in the illustrated example uses a fine-tuned version of the inflated SD unCLIP model 402 as described previously in relation to FIG. 4. The inflated SD-unCLIP model 402 applies a denoising diffusion implicit model inversion process (illustrated as "DDIM inversion 502") to produce noisy latents 504 from frames of the source digital video 124. The noisy latents 504 are latent representations of the frames of the source digital video 124 after being intentionally altered by adding noise 434, e.g., Gaussian noise. In one or more examples, the inflated SD-unCLIP model 402 systematically introduces the noise 434 to the frames of the source digital video 124, creating progressively noisier versions until a state of solely noise is reached.

The system 500, in one or more examples, performs a denoise process (illustrated as "denoise 432" in FIG. 4) of the noisy latents 504 under different conditions using deterministic DDIM sampling. Initially, the denoising 432 is guided by the source text prompt 128 and a frame of the source digital video 124 as the reference digital image 404 input to the inflated SD-unCLIP model 402 via the CLIP text 406 conditional model and the CLIP image 408 conditional model, respectively. Subsequently, the denoise 432 process is repeated using the target text prompt 134 and the target digital image 130 that includes the target object 132 as conditional inputs to the inflated SD-unCLIP model 402 via the CLIP text 406 conditional model and the CLIP image 408 conditional model, respectively.

The system 500 then computes differences (illustrated individually as compute difference 506) in the noise predicted by the convolutional neural network 410 at each denoising timestep of these two separate DDIM samplings from the respective branches. The computed differences are depicted as heat maps 508 in the illustrated example. The computed differences are then averaged over the denoising time steps and binarized (illustrated as average differences/binarize 510) to generate the masks 214 for each frame of the source digital video 124. The masks 214, once generated indicate the regions-of-interest, to which, the edits are to be applied. For example, the masks 214 are configured to indicate that edits are to be applied to an area resembling a truck rather than a car, recognizing the truck's larger size in comparison to the car as well as a different shape in comparison with the car.

Returning again to FIG. 2, the regions-of-interest 206 (e.g., the masks 214) are then passed by the region-of-interest identification module 204 to a frame generation module 216 to generate a plurality of frames 218 of a target digital video 136, e.g., as forming an edited version of the source digital video 124. To do so, the frame generation module 216 employs a generative machine-learning model 220, illustrated examples of which include one or more diffusion models (block 310). The generating is based on the regions-of-interest 206, the target digital image 130, the source digital video 124, and a source text prompt 128 describing the source digital video 124.

Figure 6:
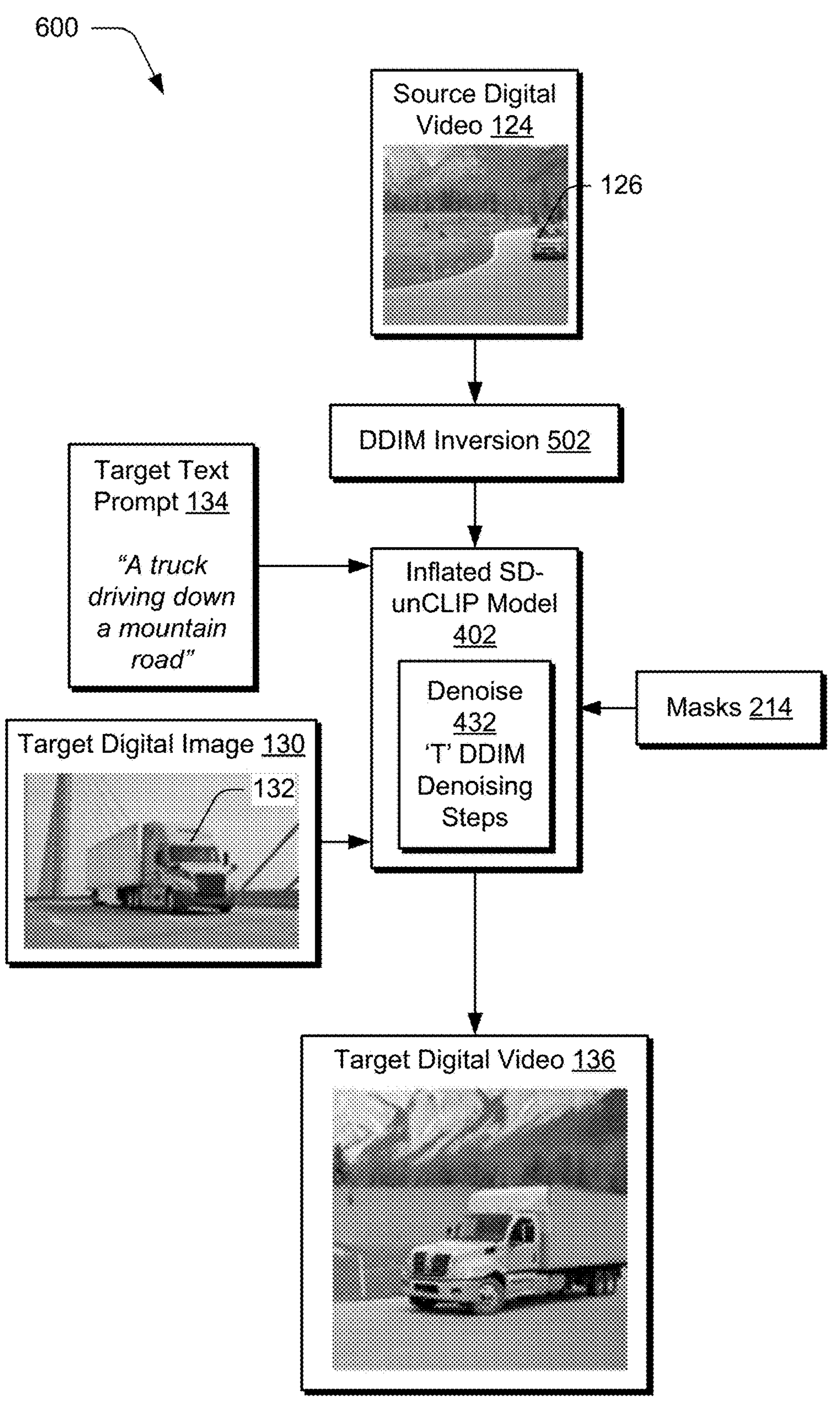
FIG. 6 depicts a system in an example implementation showing operation of a frame generation module of FIG. 2 in greater detail as performing mask guided inference.

FIG. 6 depicts a system 600 in an example implementation showing operation of the frame generation module 216 of FIG. 2 in greater detail as performing mask guided inference using the inflated SD-unCLIP model 402 as implementing the one or more diffusion models 222 of the generative machine-learning model 220. The inflated SD-unCLIP model 402 receives, as input, the source digital video 124 after being processed using DDIM inversion 502. The inflated SD-unCLIP model 402 also receives the target text prompt 134, the target object 132 as depicted by the target digital image 130, and the masks 214.

In the illustrated example, the source digital video 124 contains video frames of a source object 126 (e.g., a car) driving down a mountain road. The target text prompt 134 specifies that the inflated SD-unCLIP model 402 is to generate the target digital video 136 as an edited version of the source digital video 124 of "a truck driving down a mountain road." The target digital image 130 is an image of a truck to replace the source object 26 of the car in the source digital video 124.

The masks 214 are used to isolate features of the car to be replaced by features of the truck while maintaining the correct pose, shape, and style in the target digital video 136. Prior to generating the target digital video 136, an initial output of the inflated SD-unCLIP model 402 is denoised 432 in "T" DDIM denoising steps. In particular, the denoise 432 process is carried out "T" times (i.e., "T" denoising steps) using the inflated SD-unCLIP model 402. The same inflated SD-unCLIP model 402 is used during each denoising step in this example. The input "t" differs at each denoising step "t." The output of the "t" denoising step is fed as input to the "t+1" denoising step. A result of which is a target digital video 136 depicted as having the target object 132 which replaces the source object 126 in the source digital video 124.

Although the masks 214 are configured to accurately identify the regions-of-interest 206 that are to be a subject of an edit, the masks 214 themselves do not address temporal consistency of the target object 132 within the regions-of-interest 206 across the generated frames 218. In the illustrated example, while a shape of an edit from a "truck" to a "car" across consecutive frames may appear generally similar, a different stylistic appearance of the shape may be employed to provide visual consistency. Although conventional techniques have been developed that employ optical flow, these conventional techniques exhibit inaccuracies in scenarios involving different shapes or different stylistic appearances.

Returning again to FIG. 2, the frame generation module 216 in this example is configured to implement a latent correction strategy during inference in generation of the target digital video, functionality of which is represented as a latent correction module 224. As part of generating the frames 218 of the target digital video 136, a three-step process is performed as part of the latent correction strategy to promote temporal consistency (block 312). First, an inter-frame latent field is calculated by an inter-field computation module 226 based on features between consecutive frames 218 of the target digital video 136 (block 314), e.g., as nearest neighbors. The inter-frame latent field therefore defines a mapping from spatial locations of features in a first frame to its nearest neighbor (e.g., in terms of cosine similarity) to features in a second frame, e.g., that follows the first frame consecutively in a sequence.

Second, the frame generation module 216 utilizes a blending module to blend the computed inter-frame latent fields of adjacent frames inside the regions-of-interest 206 (block 316), i.e., as defined by the masks 214. The blending module 228, for instance, employs a decoder of a machine-learning model to perform the blending at each inference timestep corresponding to respective frames of the target digital video.

Third, a background preservation module 230 is leveraged to preserve a background of the source digital video 124 by limiting the denoising operations to the regions-ofinterest defined by the masks 214. The target digital video 136 is then output (block 318) as having the latent correction applied to the plurality of frames 218. Further discussion of applying a latent correction is included in the following description and shown in a corresponding figure.

FIG. 7 depicts a system 700 in an example implementation showing operation of the latent correction module 224 of the video generation system 116 of FIG. 2 in greater detail. During inference, the latent correction module 224 implements a feature blending strategy in the latent space of the inflated SD-unCLIP model 402 to improve inter-frame temporal consistency of the target object 132 in the target digital video 136. This is a process in which a feature correspondence map is computed and then features are blended using the feature correspondence map.

During each denoising timestep "t" during inference, the latent correction module 224 utilizes the features of an upsampling block 702 of the convolutional neural network 410 for estimating feature correspondence maps 704 between consecutive frames 218 of the target digital video 136. The upsampling block 702 is implemented, for example, as part of the convolutional blocks 416 of the decoder 414 portion of the convolutional neural network 410.

For the target digital video 136 with "N" frames, $$\text{“}[f_1^t, \ldots f_N^t]\text{”}$$

are features 706 given by the upsampling block 702 at the denoising timestep "t." Nearest neighbors 708 (illustrated using dashed lines) are defined by a nearest neighbor's field $\mathcal{N}_{\pm}(\bullet)$ as described in the following equation:

$$\mathcal{N}_{i\pm}^t[p] := \mathrm{argmin}_q \mathcal{D}(f_i^t[p], f_{i\pm1}^t[q])$$

This equation represents a mapping of spatial locations "p" in the features of the "$i^{th}$" frame to the spatial location "q" of its nearest neighbor in the features of the "$(i\pm1)^{th}$" frame.

The masks 214 "$[M_1, M_2, \ldots, M_N]$" effectively predict a coarse region in each frame where a target foreground (i.e., the target object 132) is to appear in the target digital video 136. At each timestep "t," the blending module 228 of the latent correction module 224 blends the features 706 of the consecutive frames 218 of the target digital video 136 in the masked regions in a latent space 710 of the decoder 414 of the convolutional neural network 410. The latent space 710 is denoted as "$z_t$" space at timestep "t." The blended features "$\tilde{z}_t$" are given in the equation below, $$\tilde{z}_i^t[p] = w_{-1}\left(M_i \cdot z_{i-1}^t\left[\hat{\mathcal{N}}_{i-}^t(p)\right]\right) + w_0(M_i \cdot z_i^t) + w_1\left(M_i \cdot z_{i+1}^t\left[\hat{\mathcal{N}}_{i+}^t(p)\right]\right) + (1 - M_i) \cdot z_i^t$$

where "$w_{-1}$, $w_0$, $w_{+1}$" represent weights, respectively, of non-negative hyperparameters that add up to "1" and $$\text{“}\hat{\mathcal{N}}_{i\pm}^t[p]\text{”}$$

is the nearest neighbors 708 from the above equation that are upsampled to match a dimension of the "$z_t$" space. This blending occurs at each timestep "t," thereby ensuring the target digital video 136 exhibits temporal consistency of the target object 132 between frames 218 of the target digital video 136.

In this way, the video generation system is configured to generate a target digital video having a target object that follows movement of a source object within a source digital video. To achieve this functionality, the video generation system is configured to expand expressiveness supported in editing the source digital video through use of a target digital image that depicts the target object. The expanded expressiveness also supports a variety of functionalities that are not supported by conventional digital video editing techniques, including an ability of handle edits involving objects having different size and shapes, maintaining temporal consistency between frames of the target digital video being generated, and so forth.

Example System and Device

Figure 8:
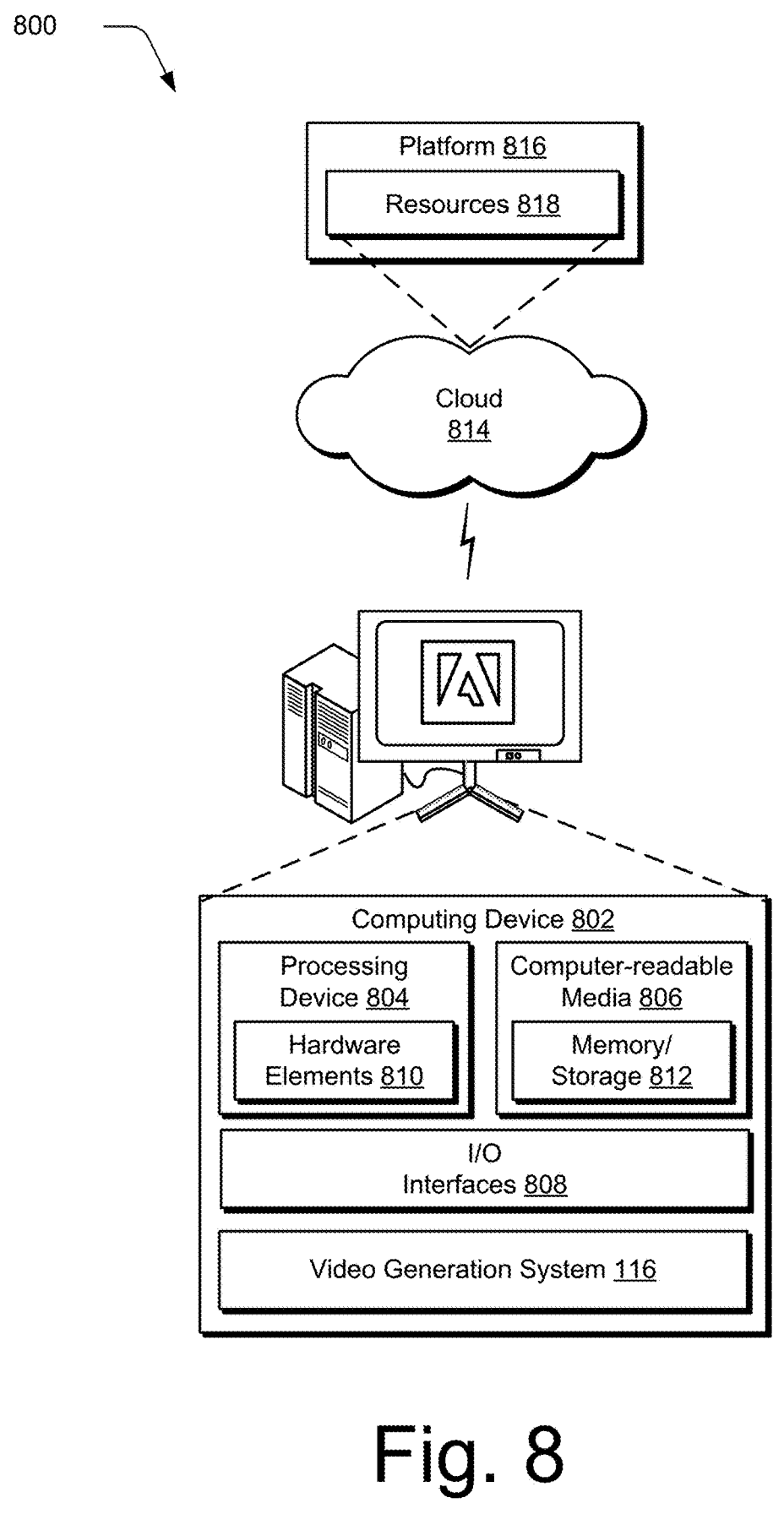

FIG. 8 illustrates an example system generally at 800 that includes an example computing device 802 that is representative of one or more computing systems and/or devices that implement the various techniques described herein. This is illustrated through inclusion of the video generation system 116. The computing device 802 is configurable, for example, as a server of a service provider, a device associated with a client (e.g., a client device), an on-chip system, and/or any other suitable computing device or computing system.

The example computing device 802 as illustrated includes a processing device 804, one or more computer-readable media 806, and one or more I/O interface 808 that are communicatively coupled, one to another. Although not shown, the computing device 802 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 804 is representative of functionality to perform one or more operations using hardware. Accordingly, the processing device 804 is illustrated as including hardware element 810 that is configurable as processors, functional blocks, and so forth. This includes implementation in hardware as an application specific integrated circuit or other logic device formed using one or more semiconductors. The hardware elements 810 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 806 is illustrated as including memory/storage 812 that stores instructions that are executable to cause the processing device 804 to perform operations. The memory/storage 812 represents memory/storage capacity associated with one or more computer-readable media. The memory/storage 812 includes volatile media (such as random access memory (RAM)) and/or nonvolatile media (such as read only memory (ROM), Flash memory, optical disks, magnetic disks, and so forth). The memory/storage 812 includes fixed media (e.g., RAM, ROM, a fixed hard drive, and so on) as well as removable media (e.g., Flash memory, a removable hard drive, an optical disc, and so forth). The computer-readable media 806 is configurable in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 802. By way of example, and not limitation, computer-readable media includes "computer-readable storage media" and "computer-readable signal media."

"Computer-readable storage media" refers to media and/or devices that enable persistent and/or non-transitory storage of information (e.g., instructions are stored thereon that are executable by a processing device) in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 802, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 810. The computing device 802 is configured to implement particular instructions and/or functions corresponding to the software and/or hardware modules. Accordingly, implementation of a module that is executable by the computing device 802 as software is achieved at least partially in hardware, e.g., through use of computer-readable storage media and/or hardware elements 810 of the processing device 804. The instructions and/or functions are executable/operable by one or more articles of manufacture (for example, one or more computing devices 802 and/or processing devices 804) to implement techniques, modules, and examples described herein.

The techniques described herein are supported by various configurations of the computing device 802 and are not limited to the specific examples of the techniques described herein. This functionality is also implementable all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 include applications and/or data that can be utilized while computer processing is executed on servers that are remote from the computing device 802. Resources 818 can also include services provided over the Internet and/or through a subscriber network, such as a cellular or Wi-Fi network.

The platform 816 abstracts resources and functions to connect the computing device 802 with other computing devices. The platform 816 also serves to abstract scaling of resources to provide a corresponding level of scale to encountered demand for the resources 818 that are implemented via the platform 816. Accordingly, in an interconnected device embodiment, implementation of functionality described herein is distributable throughout the system 800. For example, the functionality is implementable in part on the computing device 802 as well as via the platform 816 that abstracts the functionality of the cloud 814.

In implementations, the platform 816 employs a "machine-learning model" that is configured to implement the techniques described herein. A machine-learning model refers to a computer representation that can be tuned (e.g., trained and retrained) based on inputs to approximate unknown functions. In particular, the term machine-learning model can include a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, decision trees, and so forth.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:

receiving, by a processing device, a target text prompt, a target digital image depicting a target object, and a source digital video having a plurality of frames depicting a source object;

identifying, by the processing device, regions-of-interest in the plurality of frames of the source digital video, respectively, based on the target text prompt and the target digital image using a machine-learning model;

generating, by the processing device, a plurality of frames of a target digital video having the target object using a generative machine-learning model, the generating based on the regions-of-interest, the target digital image, the source digital video, and a source text prompt describing the source digital video; and outputting, by the processing device, the target digital video.

2. The method as described in claim 1, wherein the plurality of frames of the target digital video depicts the target object as following motion exhibited by the source object in the source digital video.

3. The method as described in claim 1, wherein the identifying the regions-of-interest includes forming a plurality of masks defining, respectively, the regions-of-interest.

4. The method as described in claim 3, wherein the forming the plurality of masks is based, at least in part, on the target text prompt and the target digital image.

5. The method as described in claim 1, wherein the machine-learning model, utilized to perform the identifying of the regions-of-interest, is configured as one or more diffusion models.

6. The method as described in claim 5, wherein the one or more diffusion models include:

a source denoising branch configured to process the source text prompt; and a target denoising branch configured to process the target text prompt and the target object of the target digital image.

7. The method as described in claim 6, wherein the identifying includes comparing noise differences as a reconstruction loss across respective timesteps between the source denoising branch and the target denoising branch.

8. The method as described in claim 7, wherein the identifying further comprises averaging and binarizing the noise differences to form a plurality of masks defining, respectively, the regions-of-interest.

9. The method as described in claim 1, wherein the generative machine-learning model, utilized to generate the plurality of frames, is configured as one or more diffusion models.

10. The method as described in claim 1, wherein the generating of the plurality of frames of the target digital video includes calculating a latent correction during inference involving inter-frame temporal consistency.

11. The method as described in claim 10, wherein the calculating includes computing inter-frame latent fields by mapping spatial locations of features between the plurality of frames of the target digital video.

12. The method as described in claim 11, further comprising blending the computed inter-frame latent fields at a plurality of timesteps corresponding to the plurality of frames of the target digital video.

13. The method as described in claim 1, wherein the generating of the plurality of frames of the target digital video includes preserving a background of the source digital video by correcting latent noise corresponding to the background based on the regions-of-interest.

14. A computing device comprising:

a processing device; and a computer-readable storage medium storing instructions that, in response to execution by the processing device, causes the processing device to perform operations including:

receiving a target text prompt, a target digital image depicting a target object, a source digital video having a plurality of frames depicting a source object, and a source text prompt describing the source digital video;

generating a plurality of masks defining regions-of-interest in the plurality of frames of the source digital video using a machine-learning model, the generating based on the source digital video, the target object, the target text prompt, and the source text prompt; and generating a plurality of frames of a target digital video having the target object as following motion of the source object using a generative machine-learning model based on the plurality of masks.

15. The computing device as described in claim 14, wherein the machine-learning model utilized to perform the generating of the plurality of masks is configured as one or more diffusion models.

16. The computing device as described in claim 15, wherein the generating of the plurality of masks includes comparing noise differences across respective timesteps between:

a source denoising branch of the one or more diffusion models configured to process the source text prompt and frames from the source digital video; and a target denoising branch of the one or more diffusion models configured to process the target text prompt and the target object of the target digital image.

17. The computing device as described in claim 14, wherein the generating the plurality of frames of the target digital video is performed using a generative machine-learning model based on the regions-of-interest, the target digital image, the source digital video, and the source text prompt describing the source digital video.

18. One or more non-transitory computer-readable storage media storing instructions that, in response to execution by a processing device, causes the processing device to perform operations comprising:

receiving a target text prompt, a target digital image depicting a target object, a source digital video having a plurality of frames depicting a source object, and a source text prompt describing the source digital video;

generating a plurality of masks defining regions-of-interest in the plurality of frames of the source digital video; and generating a plurality of frames of a target digital video having the target object using a generative machine-learning model, the generating based on the regions-of-interest, the target digital image, the source digital video, and a source text prompt describing the source digital video.

19. The one or more non-transitory computer-readable storage media as described in claim 18, wherein the generating a plurality of masks is performed using one or more diffusion models by comparing noise differences across respective timesteps between:

a source denoising branch of the one or more diffusion models configured to process the source text prompt and frames from the source digital video; and a target denoising branch of the one or more diffusion models configured to process the target text prompt and the target object of the target digital image.

20. The one or more non-transitory computer-readable storage media as described in claim 18, wherein the generative machine-learning model is configured as a diffusion model.

* * * * *